United States Patent
Stirton et al.

(10) Patent No.: US 7,831,324 B2
(45) Date of Patent: Nov. 9, 2010

(54) METHOD AND SYSTEM FOR RANDOMIZING WAFERS IN A COMPLEX PROCESS LINE

(75) Inventors: James Broc Stirton, Dresden (DE); Richard Good, Dresden (DE)

(73) Assignee: GlobalFoundries Inc., Grand Cayman (KY)

( * ) Notice: Subject to any disclaimer, the term of this patent is extended or adjusted under 35 U.S.C. 154(b) by 232 days.

(21) Appl. No.: 11/746,320

(22) Filed: May 9, 2007

(65) Prior Publication Data

US 2008/0103618 A1  May 1, 2008

(30) Foreign Application Priority Data

Oct. 31, 2006 (DE) .................. 10 2006 051 495

(51) Int. Cl.
*G06F 19/00* (2006.01)
(52) U.S. Cl. .................. 700/103; 700/121; 702/83
(58) Field of Classification Search .................. 700/95, 700/103, 108–110, 112, 121; 702/81–84, 702/127, 182–185
See application file for complete search history.

(56) References Cited

U.S. PATENT DOCUMENTS

| | | | |
|---|---|---|---|
| 5,716,856 A | 2/1998 | Lin et al. ................. 437/8 |
| 5,926,690 A | 7/1999 | Toprac et al. ................. 438/17 |
| 6,442,496 B1 * | 8/2002 | Pasadyn et al. ................. 702/82 |
| 6,738,682 B1 | 5/2004 | Pasadyn ................. 700/100 |
| 6,741,941 B2 * | 5/2004 | Obara et al. ................. 700/121 |
| 6,766,215 B1 * | 7/2004 | Lensing et al. ................. 700/121 |
| 6,988,045 B2 * | 1/2006 | Purdy ................. 702/83 |
| 2002/0176074 A1 | 11/2002 | Hasan ................. 356/237.5 |

OTHER PUBLICATIONS

German office action dated May 31, 2007 for Serial No. 10 2006 051 495.3-33.

* cited by examiner

*Primary Examiner*—Charles R Kasenge
(74) *Attorney, Agent, or Firm*—Williams, Morgan & Amerson, P.C.

(57) ABSTRACT

By coordinating a process regime of a process module for sample substrates used in a previously performed metrology process, an increased degree of measurement information may be obtained. For this purpose, the coordination may be based on a sampling ruleset related to the process module, wherein the previously selected sample substrates may be appropriately sequenced through the process module to increase the probability for complying with the associated sampling ruleset. Furthermore, the enhanced process coordination may be advantageously combined with randomization steps, thereby providing a "pseudo randomization," in which sample substrates are intentionally positioned, while the remaining substrates may be randomized for decoupling related process steps.

20 Claims, 4 Drawing Sheets

METHOD AND SYSTEM FOR RANDOMIZING WAFERS IN A COMPLEX PROCESS LINE

BACKGROUND OF THE INVENTION

1. Field of the Invention

Generally, the present disclosure relates to the field of fabricating microstructure devices, such as integrated circuits, and, more particularly, to the coordination of substrates during metrology and process sequences.

2. Description of the Related Art

Today's global market forces manufacturers of mass products to offer high quality products at a low price. It is thus important to improve yield and process efficiency to minimize production costs. This holds especially true in the field of semiconductor fabrication, since, here, it is essential to combine cutting edge technology with mass production techniques. It is, therefore, the goal of semiconductor manufacturers to reduce the consumption of raw materials and consumables while at the same time improve process tool utilization. The latter aspect is especially important, since, in modern semiconductor facilities, equipment is required which is extremely cost intensive and represents the dominant part of the total production costs. Consequently, high tool utilization in combination with a high production yield, i.e., with a high ratio of good devices to faulty devices, results in increased profitability.

Integrated circuits are typically manufactured in automated or semi-automated facilities, thereby passing through a large number of process and metrology steps to complete the device. The number and the type of process steps and metrology steps a semiconductor device has to go through depends on the specifics of the semiconductor device to be fabricated. A usual process flow for an integrated circuit may include a plurality of photolithography steps to image a circuit pattern for a specific device layer into a resist layer, which is subsequently patterned to form a resist mask used in further processes for forming device features in the device layer under consideration by, for example, etch, implant, deposition, polish processes and the like. Thus, layer after layer, a plurality of process steps are performed based on a specific lithographic mask set for the various layers of the specified device. For instance, a sophisticated CPU requires several hundred process steps, each of which has to be carried out within specified process margins so as to fulfill the specifications for the device under consideration. Since many of these processes are very critical, a plurality of metrology steps have to be performed to efficiently control the process flow. Typical metrology processes may include the measurement of layer thickness, the determination of dimensions of critical features, such as the gate length of transistors, for instance, in the form of a resist feature, and, after actually forming the gate electrode on the basis of the resist feature, the measurement of dopant profiles, the number, the size and the type of defects, electrical characteristics and the like. As the majority of the process margins are device specific, many of the metrology processes and the actual manufacturing processes are specifically designed for the device under consideration and require specific parameter settings at the adequate metrology and process tools.

In a semiconductor facility, a plurality of different product types are usually manufactured at the same time, such as memory chips of different design and storage capacity, CPUs of different design and operating speed and the like, wherein the number of different product types may even reach one hundred and more in production lines for manufacturing ASICs (application specific ICs). Since each of the different product types may require a specific process flow, it may be necessary to use different mask sets for the lithography, specific settings in the various process tools, such as deposition tools, etch tools, implantation tools, chemical mechanical polishing (CMP) tools, metrology tools and the like. Consequently, a plurality of different tool parameter settings and product types may be encountered simultaneously in a manufacturing environment, thereby also creating a huge amount of measurement data that are typically categorized in accordance with the product types, process flow specifics, process tools, substrate positions in the respective carriers and the like.

Generally, great efforts are made to monitor the process flow in the semiconductor plant with respect to yield affecting processes or process sequences in order to reduce undue processing of defective devices and to identify flaws in process flows and process tools. For example, at many stages of the production process, inspection steps are implemented for monitoring the status of the devices. Moreover, other measurement data may be generated for controlling various processes, in which the measurement data may be used as feedforward and/or feedback data. Desirably, the measurement data would be generated after each process step in order to verify the result of the corresponding process and use the respective measurement data for controlling the process to minimize the deviation between the measured output and the target process result. However, such a control regime is typically not compatible with economic constraints in many process sequences, since a dramatic reduction in throughput would result, and also significant additional resources in terms of metrology tools would be required. Therefore, advanced process control regimes have been developed which provide a predictive behavior for the processes under consideration with a moderate amount of input measurement data. In this way, a compromise is obtained with respect to delays and efforts generated by the metrology processes, while nevertheless providing efficient process monitoring and controllability. Thus, it is of great importance to generate the corresponding measurement data in an appropriate manner so as to obtain a broad "coverage" of the process status within the highly complex manufacturing environment while on the other hand maintain high yield and throughput.

With reference to FIG. 1, a typical process flow within a portion of a highly complex manufacturing environment, such as a semiconductor facility, will now be described in more detail in order to more clearly demonstrate the problems involved in controlling and monitoring a respective manufacturing sequence.

FIG. 1 schematically illustrates part of a manufacturing environment 100, which may be configured for fabricating complex microstructure devices, such as integrated circuits and the like. In the example shown, a respective process sequence may be illustrated in which substrates or wafers may be processed so as to obtain a respective resist feature, on the basis of which a corresponding underlying material layer may be patterned in order to receive a respective feature, such as a gate electrode of a field effect transistor, which may represent an essential component of highly complex logic circuits, such as CPUs and the like. Typically, in the manufacturing environment 100, respective substrates 101 may be handled and conveyed in respective transport carriers, wherein, typically, a predefined number of substrates 101 may be contained in a corresponding carrier, wherein the group of respective substrates 101 may be referred to as a lot. In semiconductor production, currently a typical lot size may be 25 substrates per carrier. Furthermore, a portion of the environment 100 may comprise a lithography module 110, in which any appropriate process tools and equipment may be provided for forming a corresponding resist layer on the substrates and exposing and developing the corresponding resist layer in order to obtain a respective resist feature, such as a resist feature representing a gate electrode, or any other appropriate structure under consideration. It should be appreciated that the module 110 may comprise a plurality of lithography tools and associated process tools for pre- and post-exposure treatments, wherein each of the various lithography tools may be controlled by an advanced control system 120, which is schematically illustrated as an APC block 120.

The lithography process is a highly complex and important process step and hence the corresponding process result is monitored by a corresponding metrology system 130, which may be configured to determine the respective dimension of the resist feature as obtained after processing by the lithography module 110, also referred to as DICD (developed inspection critical dimension). For example, based on the measurement results of the metrology step 130, it may be decided whether or not respective substrates have to be reworked or whether the corresponding substrates may proceed to the next process step, i.e., to an etch module 140, in which the corresponding resist feature provided by the lithography module 110 may be used for actually patterning the respective material layer, above which are formed the corresponding resist features. The etch module 140 may include a plurality of respective etch chambers, which may be provided in the form of a plurality of individual etch tools and/or in the form of respective multi-chamber etch tools and the like. Since the lithography module 110, in combination with the etch module 140, may determine the finally obtained resolution for forming the critical features, i.e., the consistent capability of creating the respective features under consideration, such as gate electrodes, within a well-defined process margin, a respective metrology module 150 may also be provided after the etch module 140 in order to obtain respective measurement data of the final process output, which is also referred to as final inspection of critical dimensions (FICD).

As previously explained, although it is desirable in view of enhanced process monitoring and process control to obtain respective measurement data on the basis of each substrate and even on the basis of each exposure step for each of the substrates 101, in practice the measurement activity has to be restricted to a reduced number of substrates per lot in order to not unduly increase cycle time within the manufacturing environment 100. Consequently, respective substrates or even measurement sites have to be selected for each lot and for each metrology step. Thus, respective "samples" may be selected and may be used, for instance, in the metrology module 130 for producing respective measurement data indicating the quality of the output of the lithography module 110. Since the respective measurement data may also be used by the controller 120, as well as for further process monitoring, for instance in the form of yield loss estimation, engineering purposes and the like, corresponding measurement data may also be supplied to respective modules 160, 170.

As previously explained, in complex situations, the selection of respective sample substrates may have to be performed to provide a broad coverage with respect to any process situation, while additionally reduce any delay in the overall process sequence in order to maintain a high overall throughput. For this purpose, typically an advanced sampling system 180 may be provided, which may have implemented therein a plurality of "sampling rules or ruleset", i.e., respective rules for selecting an appropriate set of the substrates 101 per lot on the basis of the process-specific situation that is to be covered by the subsequent metrology module, such as the module 130 or 150. For this purpose, the sampling system 180 may receive appropriate process information for estimating the "context" of the substrate to be measured, for instance of the lithography module 110 so as to obtain the desired information on the basis of an appropriately selected number of sample substrates. For example, if a given number of sample substrates is determined for the metrology module 130, for instance on the basis of process flow specific constraints, the sampling system 180 selects, on the basis of the additional context information, one or more appropriate substrates of each lot in order to provide appropriate measurement data over a plurality of lots so that the corresponding modules 120, 160 and 170 may produce appropriate outputs for controlling the modules 110, 140 for determining yield loss generating mechanisms and the like. For instance, if three substrates per lot is the corresponding sample number for the metrology module 130, the sampling system 180 may select respective three substrates of each lot such that substrates may be measured, after processing a plurality of lots, in a manner that each lithography tool, respective associated pre- and post-treatments and the like may be measured. In this manner, respective information for efficient control of the respective process tools in the module 110 by the controller 120 may be generated. For example, in advanced APC strategies, the corresponding measurement data may be categorized, for instance with respect to specific tool combinations in the respective process module, for instance, a combination of a specific lithography tool in combination with a post-exposure bake tool, so that the sampling system 180 may select the respective sample substrates for producing measurement results with respect to each item of the corresponding categories after a reasonable number of processed lots.

A similar situation may be encountered after the etch module 140, wherein the sampling system 180 may use a different sampling regime based on a different ruleset in order to account for the specific process situation prior to the metrology module 150. For example, in view of enhanced process control, it may be necessary to measure the same samples as in the module 130, for instance so as to detect or eliminate respective systematic drifts which may be important aspects for the respective APC regimes for the modules 110 and 140. Hence, the sampling system 180 may select a respective substrate previously measured prior to forwarding the substrate to the module 150, wherein additional constraints may be imposed on the selection of additional sample substrates, since the previously chosen sample substrates may not necessarily comply with the requirements dictated by the etch module 140, in particular, when a corresponding randomization step has been performed on the basis of a respective randomization system 190, which may be provided in order to obtain a certain decoupling between highly critical process steps. The randomization system 190 may comprise a randomizing unit 195 for generating random wafer positions for a specific lot in combination with a corresponding wafer positioning unit 196, which may act on the corresponding substrates so as to provide a respective wafer sorting within the respective transport carrier based on the random positions created by the unit 195. In this way, the possible "amplification" of systematic drifts and deviations in the modules 110 and 140 may be reduced.

During a typical operational situation in the environment 100, respective lots of substrates 101 may be continuously entered into the lithography module 110, which may provide respective processed substrates for which the sampling system 180 may select respective candidates for being subjected to measurement within the module 130. The sampling system 180 may select, in a highly dynamic manner, the respective sample substrates so as to provide a desired coverage, even though only a small number of sample substrates per lot may be used. Thereafter, the corresponding wafer resorting may be performed on the basis of a randomization process by the system 190 and, thereafter, the respective randomized lot may enter the etch module 140. In the etch module 140, the respective substrates 101 may be processed by a plurality of etch chambers on the basis of their random position in the respective transport carriers, and this context information may be provided to the sampling system 180 in order to obtain, in a correspondingly adapted manner, an appropriate subset of sample substrates that have to be subjected to a measurement process in the metrology module 150. Typically, the sampling ruleset used in selecting sample substrates prior to the module 130 may not be uncorrelated with the rules used for selecting the sample substrates prior to the metrology module 150 since, as previously explained, for example, the same sample substrates may have to be measured in both modules 130 and 150, for instance with respect to eliminating systematic deviations. Consequently, by selecting the same sample substrates, usually respective process situations in the etch module 140 may not be appropriately covered and, thus, corresponding information may not be available for the modules 120, 160 and 170.

For instance, as to the module 130, the substrates 1, 12 and 20 may be selected as appropriate samples, for instance with respect to two lithography tools that may be used in the lithography module 110, wherein the respective substrates 1, 12 and 20 may be processed by different post-exposure tools. In a subsequent lot, the sampling system 180 may also choose three respective substrates having been processed by the different lithography tools and by different post-exposure tools, for instance when two lithography tools and six post-exposure tools may be used in the module 110. Consequently, in this case, a coverage of the six process tracks defined by the involved process tools would be obtained after two processed lots. It should be appreciated that other criteria may also be applied, for instance the position of the respective substrates in the transport carrier and the like. Since the same substrates 1, 12 and 20 have to be measured for the specific lot under consideration after the etch module 140, these substrates may not, however, provide the desired coverage of the process situation in the etch module 140. For instance, two or three of these substrates may have been processed by the same etch chamber, thereby providing a highly unbalanced amount of measurement data, while possibly not covering the respective operational behavior of other etch chambers in the module 140. In this case, the created measurement data may be less efficient, since certain process situations may be "over determined," while effective measurement data for other situations may be available after a significant delay, after having processed a respective number of lots until, finally, the corresponding process situation may be covered. Thus, in some situations, the sampling system 180 may additionally select further sample substrates, such as the substrates 5 and 9, in order to provide an increased coverage of the process situation in the etch module 140. In this case, significant additional measurement resources are required and may therefore result in a significantly reduced overall throughput in the manufacturing environment 100.

It should be appreciated that the above process sequence is an illustrative example for many other respective process situations, in which coupled metrology steps have to be performed on the basis of respective sampling criteria and, in situations as described above, the respective measurement data may not be efficiently generated, thereby a loss of information may occur, or additional measurement activities have to be performed, resulting in a reduced overall throughput.

The present disclosure is directed to various methods and systems that may avoid, or at least reduce, the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the subject matter disclosed herein relates to a technique for appropriately coordinating the process flow in a portion of a manufacturing sequence and the generation of measurement data relating to at least two different stages. For this purpose, the respective rules for selecting sample substrates for a metrology process related to a first process state and a respective sampling ruleset for a metrology process related to a second process stage may be taken into consideration prior to actually processing the respective substrates in a process module corresponding to the second process stage. In this manner, any randomizing effects, which may frequently be intentionally introduced between complex and critical processes, or which may be created by the operation of process tools, such as cluster tools and the like, may be compensated for or at least significantly reduced with respect to the respective sample substrates, thereby increasing the degree of measurement data coverage obtained by the respective first and second metrology processes for a given number of sample substrates. Consequently, in some illustrative embodiments, a certain degree of randomization may be maintained for substrates that are not involved in the first and the second metrology processes, while the corresponding sample substrates may be scheduled in the further processing in the second process module so as to enhance the relevance of the correspondingly generated measurement data, while not contributing to further process complexity or even reduce the overall cycle time of the respective substrates.

According to one illustrative embodiment disclosed herein, a method comprises obtaining a first sampling ruleset for a group of substrates, the substrates of which are to be processed in a first metrology process of a manufacturing environment including a first process module and a second process module, wherein the first metrology process measures a process result of the first process module. The method further comprises obtaining a second sampling ruleset for the group of substrates to be processed in a second metrology process, wherein the second metrology process measures a process result of the second process module at least on the basis of the substrates. Finally, the processing of the group of substrates in the second process module is coordinated according to the first and the second sampling rulesets.

According to another illustrative embodiment disclosed herein, a process coordination system comprises a sampling unit that is configured to obtain process information from a first process module and a second process module of a manufacturing environment. Furthermore, the unit is configured to provide, on the basis of the process information, a first ruleset for selecting a first substrate of sample substrates from a group of substrates to be processed in the first and the second process modules. A first subset of sample substrates is to be measured in a first metrology process after processing the substrates in the first process module. Furthermore, the unit is configured to provide a second ruleset for selecting sample substrates to be measured in a second metrology process after processing the substrates in the second process module. The process coordination system further comprises a substrate positioning unit configured to position substrates at specified positions of a transport carrier. Furthermore, the system comprises a coordination unit operatively coupled to the sampling unit and the substrate positioning unit and configured to determine dedicated positions for each substrate of the first subset on the basis of the second ruleset.

According to yet another illustrative embodiment disclosed herein, a process coordination system comprises a sampling unit configured to obtain process information from first and second process modules of a manufacturing environment to provide, on the basis of the process information, a first ruleset for selecting a first subset of sample substrates from a group of substrates to be processed in the first and second process modules. The first subset of sample substrates is to be measured in a first metrology process after processing the substrates in the first process module. Furthermore, the sampling unit is configured to provide a second ruleset for selecting sample substrates to be measured in a second metrology process after processing the substrates in the second process module. Furthermore, the system comprises an interface for communicating with at least one process tool of the second process module in order to control a sequence of substrate processing in at least one process tool. Finally, the system comprises a coordination unit operatively coupled to the sampling unit and the interface, wherein the coordination unit is configured to determine a dedicated process sequence at least for each substrate of the first subset on the basis of the second sampling ruleset.

BRIEF DESCRIPTION OF THE DRAWINGS

The disclosure may be understood by reference to the following description taken in conjunction with the accompanying drawings, in which like reference numerals identify like elements, and in which.

Figure 1:
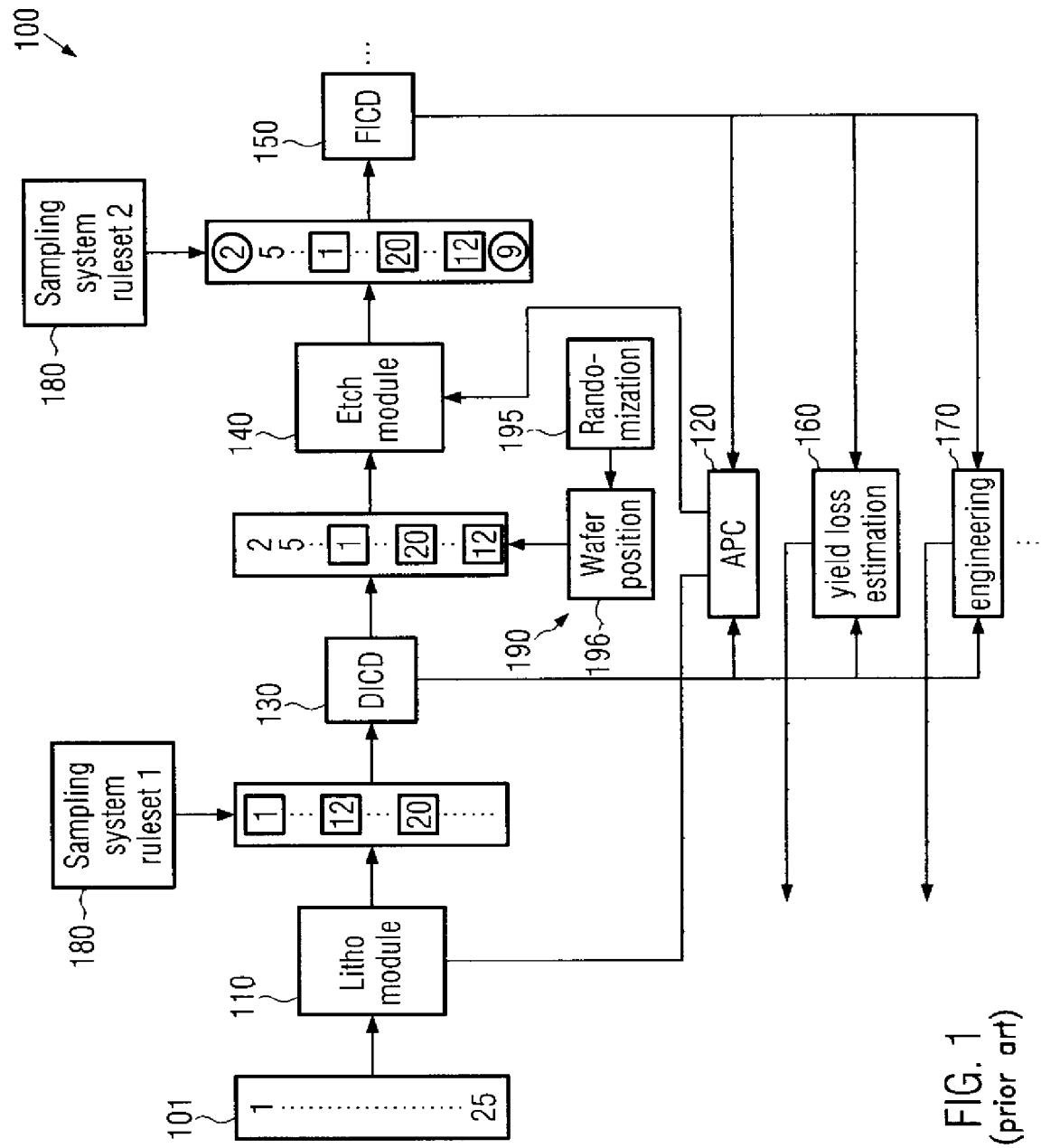
FIG. 1 schematically illustrates a manufacturing environment including a lithography module and an etch module with associated metrology processes, wherein conventional advanced sampling techniques are applied in combination with randomization of substrates for enhanced decoupling of critical process steps according to conventional techniques.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The subject matter disclosed herein relates to a technique for increasing the efficiency of advanced wafer sampling systems in combination with respective randomization steps in order to increase the amount of useful information obtained from coupled metrology processes. Advanced or dynamic wafer sampling systems may allow, as previously explained with reference to FIG. 1, the selection of wafers, which are to be measured in a given metrology process, wherein the respective selection may be based on dynamic rules in order to provide a high degree of flexibility in responding to the current process situation in the manufacturing environment under consideration. For instance, by taking into account the available context information, that is, process information about the status of respective process tools, the status of respective substrates, the position of substrates in a transport carrier and the like, substrates may be selected in such a way that the efficiency of the measurement may be increased or maximized. Consequently, complex scenarios, such as specific process chambers, substrate positions in the carrier, combinations thereof and the like, may be covered on the basis of respective sampling systems. Nevertheless, in many cases, respective restrictions may be imposed on the sampling system that must be observed, depending on the process requirements. As previously explained, there is often a limit on the total number of sample substrates that may be selected for the respective measurement processes. This may mean that only a subset of the sampling objectives are satisfied by a given group or lot of substrates. For instance, certain substrates may have to be selected for measurement, such as base line measurement, wherein the same substrates are to be used for measurement at each involved metrology process, such as defect inspection and the like. In these cases, the advanced sampling system may be operated so as to maximize the benefit or minimize the penalty within the restricted set of options wherein, as previously explained, a significant loss of information may occur in the subsequent measurement process or a respective significant additional measurement activity, for instance by selecting additional measurement sides or sample substrates, may have to be performed so as to also satisfy the demand for high data coverage for the subsequent metrology processes.

In the present disclosure, the potential for satisfying the respective requirements, that is, the corresponding sampling rules, for the restricted scenarios may be significantly increased by coordinating the process flow within the respective process module on the basis of the first and the second sampling rules. This may be accomplished by appropriately positioning the respective sample substrates prior to actually performing the subsequent process steps, wherein the respective coordination may be performed to obtain a high degree of compliance with the respective sampling rules related to the subsequent metrology process. Consequently, a high degree of data coverage may be obtained with the same amount of metrology activities. In some illustrative embodiments, the respective process coordination may be combined with a desired degree of randomization, thereby providing a "pseudo" randomization, wherein a respective subset of sample substrates may be positioned for the further processing in such a way that an increased measurement data coverage may be obtained while the remaining substrates may be subjected to a randomization process, thereby providing a high degree of decoupling of critical process steps, such as a critical lithography step followed by a critical etch step. The respective process coordination may be obtained on the basis of a corresponding substrate positioning process performed prior to entering the substrates into the subsequent process module and/or by controlling a corresponding process tool within the subsequent process module in such a way that the processing of the substrates may comply to the respective sampling ruleset.

Figure 2A:
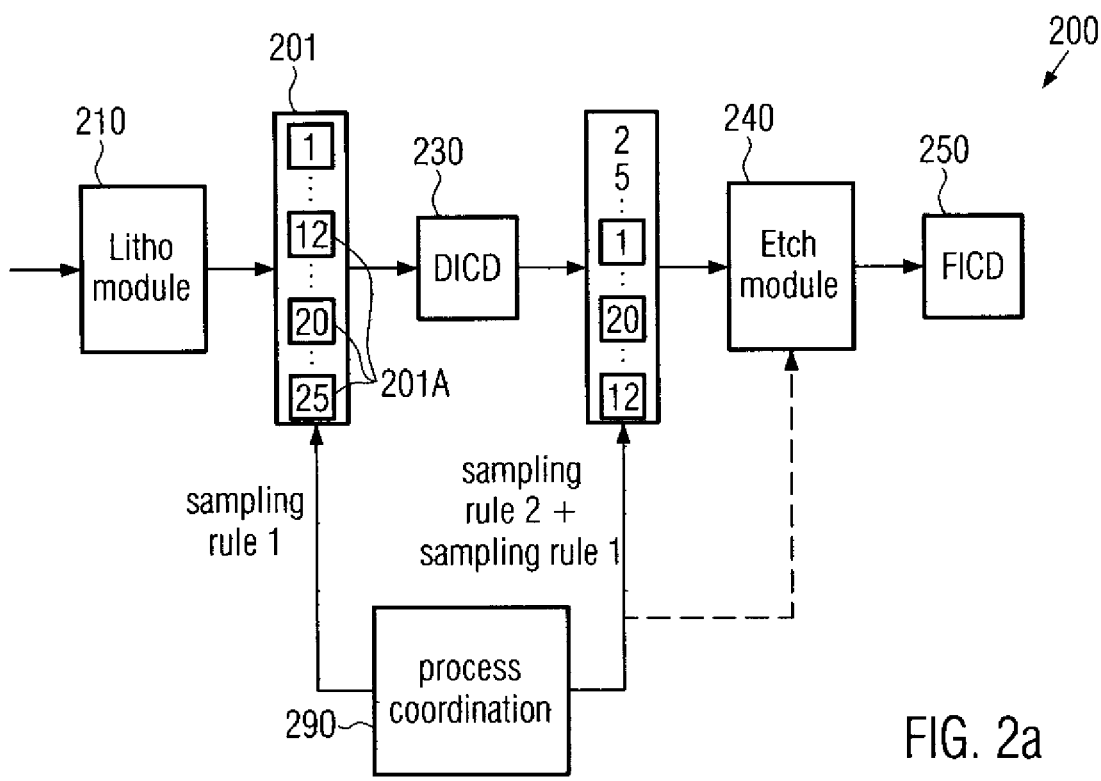
FIG. 2a schematically illustrates a portion of a complex manufacturing environment including first and second process modules and associated metrology processes, in which process flow coordination is performed on the basis of respective sampling rules providing for increased measurement data coverage in the second metrology process according to illustrative embodiments disclosed herein.

FIG. 2a schematically illustrates a portion of a manufacturing environment 200 including a first process module 210 and a second process module 240. In illustrative embodiments, the manufacturing environment 200 may represent a semiconductor production line, wherein the first module 210 may represent a corresponding section for performing one or more related process steps, wherein the process result of the module 210 may require a corresponding monitoring of the process output on the basis of a corresponding metrology process performed by a first metrology system 230. Similarly, the process result obtained after the process module 240 may need to be verified on the basis of a measurement process, which may be performed on the basis of a second metrology system 250. In some illustrative embodiments, the respective metrology processes performed by the systems 230 and 250 may be coupled in the sense that the substrates subjected to the measurement process in the system 230 may also have to be measured in the system 250 in order to eliminate substrate-to-substrate variations in evaluating the entire process flow in the modules 210, 240, or when using the respective measurement data for advanced control strategies. Moreover, the manufacturing environment 200 may comprise a process coordination system 290, which may be configured to coordinate the process flow at least within the second process module 240 on the basis of respective sampling rules in order to obtain significantly increased compliance with the respective sampling rules compared to conventional techniques as are previously described with reference to FIG. 1.

During the operation of the process coordination system 290 within the environment 200, a group of substrates 201 may have been processed by the process module 210, for instance, the process module 210 may represent a complex manufacturing sequence for forming metallization layers involving respective etch, deposition and polishing processes, wherein the corresponding result of the process module 210 may be monitored, for instance, with respect to a corresponding defect rate of the finally obtained metallization level, the electric performance and the like. In other cases, the process module 210 may comprise a lithography process in combination with any associated processes, as is for instance described above with reference to FIG. 1. Since the respective measurement results obtained after the process module 210 may be used for advanced process control (APC), yield loss estimation and the like, a corresponding amount of "measurement" noise may be disadvantageous and, thus, substrate-to-substrate variations may be eliminated by performing respective measurements of the substrates after having been processed in the second process module 240 by using at least the same sample substrates used for determining the process results of the module 210. In such a situation, the process coordination system 290 may use an appropriate sampling ruleset for selecting a specific subset 201A (e.g., substrates 12, 20 and 25) of the substrates 201 that may fulfill the desired sampling criteria for the module 210. For example, for a given restricted number of substrates to be selected for the subset 201A, a corresponding selection may be based on criteria, such as covering each available process track within the module 210, that is, each possible combination of process tools for passing a substrate through the module 210, covering all substrate positions in the respective transport carrier and the like, wherein the corresponding coverage may be achieved over a plurality of groups of substrates, since the respective criteria may not be complied with on the basis of a single group of substrates due to the restrictive number of sample substrates 201A. Consequently, the corresponding sample substrates may be identified by the system 290 and may be subjected to measurement within the metrology system 230.

Prior to supplying the substrates 201 to the second process module 240 for further processing, the system 290 may further determine an appropriate process regime for the processing of the substrates 201 in the module 240 based on the first and second sampling rulesets to obtain a high degree of compliance with the second sampling ruleset that is specifically adapted to the process situation in the second process module 240, while nevertheless using the sample substrates defining the subset 201A as previously used in the first metrology system 230. Thus, at least the members of the subset 201A may be arranged or scheduled such that a high degree of compliance with the second sampling ruleset may be obtained for these substrates during the processing in the module 240 so that, in the subsequent measurement process in the system 250, the corresponding samples of the subset 201A may provide the desired elimination of substrate-to-substrate variations, while nevertheless providing a high degree of compliance with the second sampling ruleset. A corresponding coordination of the process flow, at least for the members of the subset 201A, may be accomplished by appropriately positioning the substrates 201 in a respective transport carrier prior to processing the substrates in the module 240 and/or by correspondingly controlling the process sequence within the module 240, as will be described later on in more detail. Consequently, by respectively coordinating the process flow by means of the system 290, the representatives of the subset 201A have an increased probability for being processed so as to comply to the requirements of the sampling ruleset 2.

For example, if three substrates are selected as the size of the subset 201A prior to the metrology process in the system 230, a corresponding sampling ruleset may be selected or dynamically adapted in order to satisfy the corresponding requirements for the process module 210 as explained above. The same three substrates may have to be measured in the metrology system 250 after being processed in the module 240, wherein the process coordination system 290 may provide a respective sequencing of the substrates of the subset 201A such that a high probability may be generated for being processed by different process tools, when the sampling ruleset 2 may specify a high degree of coverage of the process tools included in the module 240.

Figure 2B:
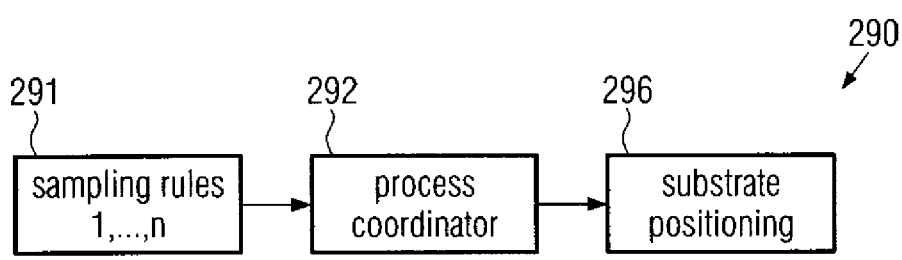
FIG. 2b schematically illustrates the process coordination system including a corresponding substrate positioning unit according to one illustrative embodiment.

FIG. 2b schematically shows an illustrative embodiment of the process coordination system 290, which may comprise a sampling system 291, a process coordinating unit 292 and a substrate positioning unit 296. In this embodiment, the sampling rules may be obtained or established on the basis of respective process information and other criteria as previously explained, which may be provided to the process coordinating unit 292, which may establish an appropriate positioning regime for a corresponding transport carrier for providing the substrate to the module 240. Thus, the process coordinating unit 292 may instruct the substrate positioning unit 296 to adjust or re-adjust the positions of the substrates in the corresponding carrier in order to obtain a high probability for compliance with the sampling ruleset related to the process module 240. In the above-specified example, the respective three substrates of the subset 201A may be appropriately positioned within the respective transport carrier in order to obtain a high probability that each of the substrates will be processed by a unique or different process tool or chamber in the module 240. For instance, if a process tool having two process chambers may be used, which may usually be alternately supplied with substrates, two of the members of the subset 201A may be positioned in adjacent positions to ensure processing in different processing chambers. A corresponding coordinating regime for appropriately positioning the substrates of the subset 201A may be accomplished by using process-related information supplied to the process coordinating unit 292, which may include information on the current status of the module 240, so that a corresponding operational behavior of the module 240 upon arrival of the substrates 201 may be predicted, as will be described later on in more detail.

Figure 2C:
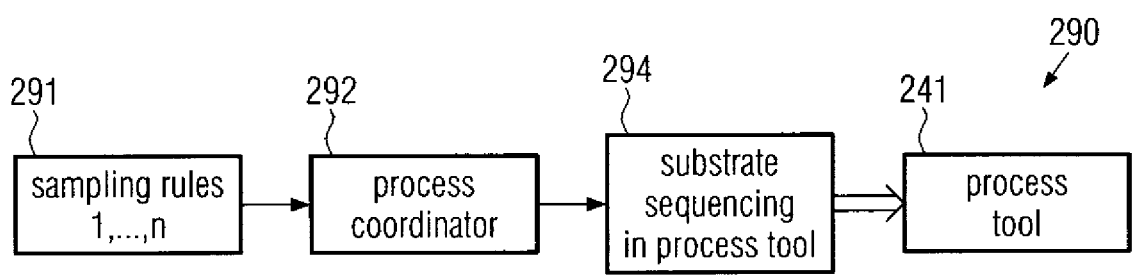
FIG. 2c schematically illustrates the process coordination system according to yet another illustrative embodiment, in which the process sequence in a process tool may be appropriately manipulated.

FIG. 2c schematically illustrates the process coordination system 290 according to a further illustrative embodiment, in which, additionally or alternatively to the substrate positioning unit 296, an interface 294 may be provided that is connected to the process coordinating unit 292, wherein the interface 294 may be configured to enable communication with one or more process tools 241 within the second process module 240. The process tool 241 may represent a tool having implemented therein a plurality of process chambers, which may be supplied with substrates on the basis of a corresponding substrate handling system (not shown). Consequently, the process coordinating unit 292 may provide a respective process regime via the interface 294 to the process tool 241 so as to instruct the tool 241 to process the substrates 201 and, in particular, the members of the subset 201A, according to the established process regime for obtaining the desired degree of compliance with the second sampling ruleset. Consequently, since the process coordinating unit 292 may directly determine the sequencing within the process module 240, at least for the process tool 241, an even increased degree of compliance with the sampling ruleset 2 may be accomplished, while additionally avoiding any wafer sorting processes prior to the actual processing of the substrates 201. Hence, the cycle time of the substrates 201 may be reduced while, nevertheless, an enhanced measurement data coverage may be obtained.

It should be appreciated that, in the embodiments described above, a desired degree of "randomizing" effect may also be imparted by the corresponding process coordination provided by the unit 292 to the remaining substrates 201, which do not belong to the subset 201A.

Figure 2D:
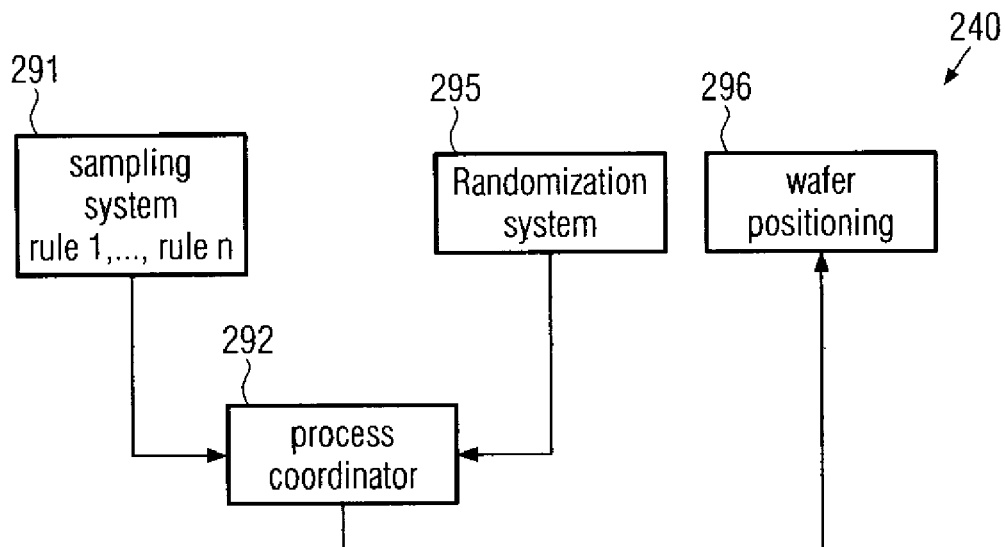
FIG. 2d schematically illustrates the process coordination system according to a further illustrative embodiment, in which a certain degree of randomization may be involved in coordinating the process flow on the basis of sampling rules.

FIG. 2d schematically illustrates a corresponding embodiment of the process coordination system 290, in which a randomization unit 295 may be operatively connected to the coordinating unit 292 in order to provide a certain degree of randomization, which may also be referred to as "pseudo randomization." For this purpose, the unit 292 determines an appropriate process regime, as explained above, while the randomization unit 295 may provide an appropriate random effect by, for instance, providing respective random positions for the remaining substrates 201 in the transport carrier under consideration, prior to being processed in the module 240. In other illustrative embodiments, in which the coordinating unit 292 may directly act on a corresponding process tool, such as the tool 241 (FIG. 2c), the randomizing unit 295 may provide a respective randomized process sequence for substrates other than members of the subset 201A. In this manner, an intentionally provided randomization may be obtained on the basis of the internal resources, substantially without affecting the overall throughput of the respective process tool. In this way, the resulting overall cycle time of the substrates may be significantly reduced.

Figure 2E:
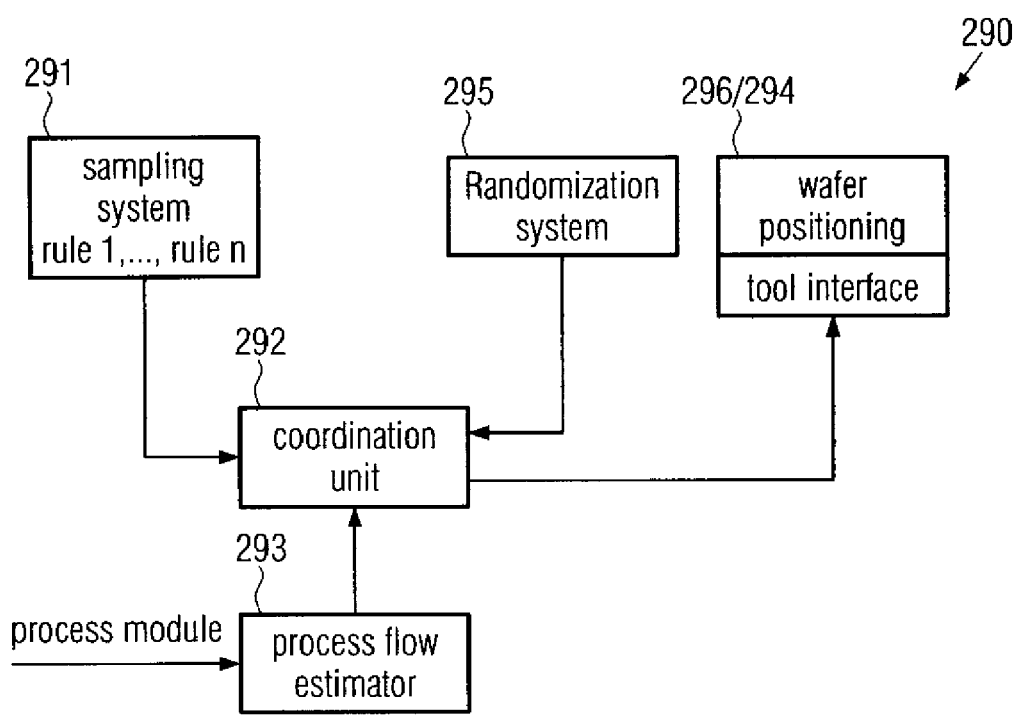
FIG. 2e schematically illustrates the process coordination system according to a further illustrative embodiment, in which a process flow estimator may be integrated.

FIG. 2e schematically illustrates the coordination system 290 according to further illustrative embodiments disclosed herein. The system 290 may comprise the sampling unit 291 and the coordinating unit 292, while, in some illustrative embodiments, the randomizing unit 295 may also be provided. Similarly the wafer position unit 296 and/or the respective tool interface 294 may be provided, depending on the system requirements. In addition, the system 290 may comprise a process flow estimator 293, which may be configured to receive process information relating to at least the second process module 240 in order to provide an estimation of the future operational behavior within the module 240 upon arrival of the substrates 201 to be subsequently processed therein. For example, the respective process information may include information about the current process situation within the module 240, which may include the tool status of one or more of the process tools contained therein, the status of the currently processed substrates and the like. Furthermore, the process information may include other information for estimating the operational behavior, for instance, information with respect to predicted maintenance events, engineering phases and the like, as well as general cycle times of currently used process recipes and the like. On the basis of this information, the process flow estimator 293 may predict with high probability the future "destiny" or the future progression of the process of a substrate entering the process module 240. From the respective prediction of the operational behavior of at least significant portions of the process module 240, the coordinating unit 292 may then select an appropriate substrate position or an appropriate sequencing regime for respectively positioning the substrates of the subset 201A within a transport carrier and/or for appropriately instructing the process tool 241 for sequencing the substrates 201 through the process module 240. The process coordination system 290 may provide an appropriate coordination regime of the sequencing of substrates through the module 240 for any number of possible scenarios, while nevertheless maintaining a high probability for complying with the respective sampling ruleset for the module 240, as is previously explained.

Figure 2F:
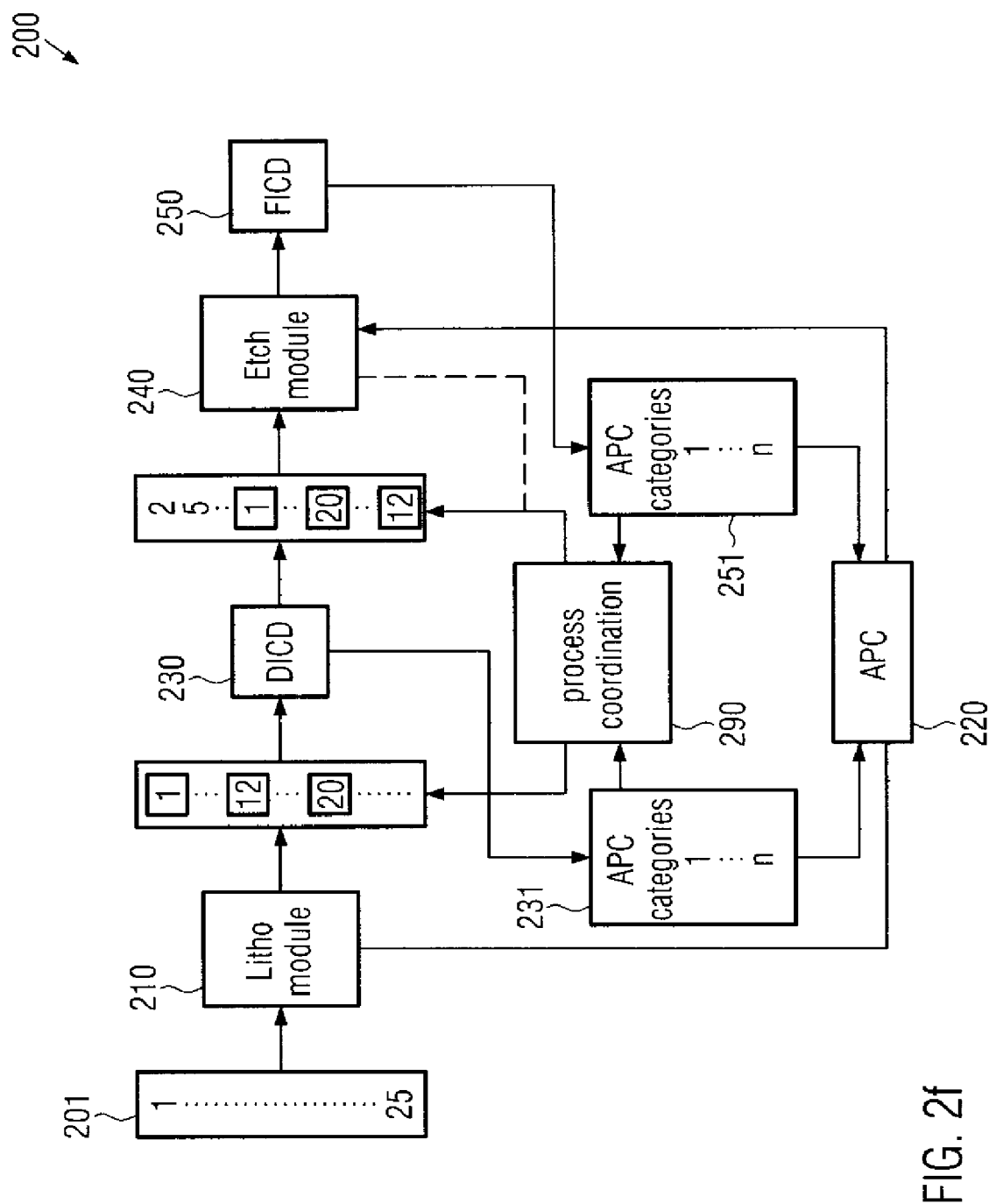
FIG. 2f schematically illustrates the process coordination system operated in a manufacturing environment so as to enhance the data coverage of respective APC categories according to yet further illustrative embodiments.

FIG. 2f schematically illustrates the process coordination system 290 within the manufacturing environment 200 according to further illustrative embodiments. In these embodiments, the process coordination system 290 may be operated in order to optimize, or at least significantly enhance, the significance of the respective measurement data produced by the systems 230, 250 with respect to a dedicated measurement data evaluation regime. For example, as previously explained with reference to FIG. 1, the corresponding measurement data may be used for yield loss estimation, engineering purposes, advanced control strategies and the like. Consequently, the respective sampling rules may be selected such that the respective measurement coverage may be increased or optimized for at least one of these data evaluation purposes.

Enhancing data coverage for an advanced APC regime 220 will be referred to in the following illustrative embodiment. For this purpose, one or more APC data categories 231 may be established for the process module 210 on the basis of the corresponding measurement data by the system 230 and, similarly, one or more APC categories 251 may be defined for the measurement data obtained from the metrology system 250. The respective APC categories may each represent appropriate "boxes," which may identify respective process tracks within the modules 210, 240 in order to impart enhanced efficiency to the controller 220. For instance, when the process module 210 comprises respective lithography tools in combination with associated systems for pre- and post-exposure treatments, specific combinations of one or more of these process tools may define a specific APC category so that the corresponding APC strategy may use measurement data belonging to the same category only in order to appropriately enhance the control quality. That is, if, for example, a combination of a coating tool, a lithography tool and a post-exposure bake tool may define a category, the system 290 may use a sampling ruleset so as to obtain a high degree of coverage of all possible items of the respective category with a minimum of lots that have to be processed in order to obtain appropriate measurement data for each item of the category under consideration. Similarly, a respective category may be defined with respect to the module 240, and the system 290 may provide high probability of meeting the corresponding sampling ruleset so as to obtain respective measurement data with high efficiency, that is, the respective items of the category under consideration may be "filled," after initialization, with low delay, i.e., within a low number of process runs. Hence, the efficiency of the controller 220 may be significantly enhanced, while nevertheless the amount of measurement activities may be similar to conventional strategies while, at the same time, the overall throughput may remain substantially the same or may even be significantly increased as is previously explained.

As a result, the subject matter disclosed herein provides a technique for enhancing the significance of measurement data with respect to coupled measurement processes in that the sample substrates used in a first measurement process may also be used in a second measurement process, wherein the process sequence in the second measurement process may be appropriately coordinated in order to provide a high potential for compliance with an appropriate sampling regime for the second process. Consequently, measurement activities, for instance by selecting additional sample substrates for the second measurement process, may be significantly reduced compared to conventional strategies, thereby contributing to a performance gain of respective data evaluation processes using the correspondingly obtained measurement data. For example, the efficiency and the convergence of respective APC strategies may be enhanced after any initialization events, since the sequencing of the second manufacturing process may be appropriately coordinated to obtain significantly enhanced coverage of respective APC categories for a given amount of measurement activities. Similarly, data evaluation, for instance yield loss estimations, engineering tasks and the like, may also be significantly enhanced. In some illustrative embodiments, the process coordination may be combined with the randomization of non-selected substrates, thereby providing a desired degree of decoupling of related critical processes, such as lithography and etch processes. Furthermore, the respective probability of compliance with the sampling ruleset of the second manufacturing process and, thus, the degree of finally obtained compliance with these rulesets may be enhanced by instructing a respective process tool in the process module under consideration to process the respective substrates on the basis of a processing regime as provided by the coordination system, thereby achieving, in some cases, at least for the manipulated process tool, a nearly 100% compliance with the respective sampling ruleset. Furthermore, in this way, the process of re-sorting substrates may be performed by tool-internal resources, thereby significantly reducing any additional substrate handling processes. In some illustrative embodiments, the tool-internal resources may thus also be used for obtaining the desired degree of randomization for non-sample substrates, thereby significantly reducing cycle times compared to conventional strategies. Hence, advanced wafer sampling strategies may be efficiently combined with randomization techniques, thereby enhancing the useful information obtained from coupled metrology processes.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   obtaining a first sampling ruleset for a group of substrates, a subset of which is to be processed in a first metrology process of a manufacturing environment including a first process module and a second process module, said first metrology process measuring a process result of said first process module;

obtaining a second sampling ruleset for said group of substrates to be processed in a second metrology process, said second metrology process measuring a process result of said second process module at least on the basis of said subset; and coordinating the processing of said subset of substrates by said second process module according to said first and second sampling rulesets.

2. The method of claim 1, wherein coordinating said processing of said subset of substrates in said second process module comprises positioning each of said substrates of said subset in a dedicated position of a transport carrier used to transfer said group of substrates from said first metrology process to said second process module.

3. The method of claim 2, further comprising obtaining process information indicating a current process situation in said second process module prior to positioning said substrates of said subset in said dedicated positions, and determining each dedicated position on the basis of said process information to achieve a maximum compliance of a process sequence in said second process module with said second sampling ruleset.

4. The method of claim 1, wherein coordinating said processing of said subset of substrates in said second process module comprises instructing at least one process tool of said second process module to process at least one of the substrates of said subset according to said second sampling ruleset.

5. The method of claim 4, further comprising obtaining process information indicating a current process situation in said second process module prior to processing said group of substrates in said second process module, and determining a process sequence in said at least one process tool on the basis of said process information to achieve a maximum compliance of said process sequence with said second sampling ruleset.

6. The method of claim 1, further comprising performing a randomization process on the basis of substrates not belonging to said subset prior to processing said group of substrates in said second process module.

7. The method of claim 1, wherein said first sampling is based on a fixed number of members of said subset, and wherein said first sampling is selected to provide maximum data coverage of measurement data categories used for controlling said first process module.

8. The method of claim 1, wherein said second sampling ruleset is selected to provide maximum data coverage of measurement categories used for controlling said second process module.

9. The method of claim 8, wherein said second sampling ruleset further comprises the constraint of only using substrates of said subset.

10. The method of claim 1, wherein said first metrology process determines characteristics of a lithography process and said second metrology process determines characteristics of a patterning process based on said lithography process.

11. The method of claim 1, wherein said first and second metrology processes provide defect rate measurement data.

12. A process coordination system, comprising:

a sampling unit configured to obtain process information from a first and a second process module of a manufacturing environment and to provide, on the basis of said process information, a first ruleset for selecting a first subset of sample substrates from a group of substrates to be processed in said first and second process modules, said first subset of sample substrates to be measured in a first metrology process after processing in said first process module, and to provide a second ruleset for selecting sample substrates to be measured in a second metrology process after processing in said second process module;

a substrate positioning unit configured to position substrates at specified positions of a transport carrier; and a coordination unit operatively coupled to said sampling unit and said substrate positioning unit and configured to determine dedicated positions for each substrate of said first subset on the basis of said second ruleset.

13. The process coordination system of claim 12, further comprising a randomization unit configured to generate random positions for substrates other than substrates of said first subset.

14. The process coordination system of claim 12, further comprising a process estimation unit operatively coupled to said coordination unit and configured to predictively estimate a process flow in said second process module on the basis of a current process status of said second process module.

15. The process coordination system of claim 12, wherein said manufacturing environment represents a portion of a semiconductor production line.

16. The process coordination system of claim 12, further comprising an interface for communicating with at least one process tool of said second process module, wherein said coordination unit is configured to instruct said at least one process tool to process said first subset according to a sequence based on said second ruleset.

17. A process coordination system, comprising:

a sampling unit configured to obtain process information from a first and a second process module of a manufacturing environment and to provide, on the basis of said process information, a first ruleset for selecting a first subset of sample substrates from a group of substrates to be processed in said first and second process modules, said first subset of sample substrates to be measured in a first metrology process after processing in said first process module, and to provide a second ruleset for selecting sample substrates to be measured in a second metrology process after processing in said second process module;

an interface for communicating with at least one process tool of said second process module to control a sequence of substrate processing in said at least one process tool; and a coordination unit operatively coupled to said sampling unit and said interface and configured to determine a dedicated process sequence at least for each substrate of said first subset on the basis of said second ruleset.

18. The process coordination system of claim 17, further comprising a randomization unit configured to generate a random process sequence for said at least one process tool for substrates other than substrates of said first subset.

19. The process coordination system of claim 18, wherein said interface is further configured to receive process information indicating a current status of said second process module.

20. The process coordination system of claim 19, wherein said randomization unit is configured to generate said random process sequence on the basis of said process information.

* * * * *